United States Patent
Hopkins et al.

(10) Patent No.: US 9,603,485 B2
(45) Date of Patent: Mar. 28, 2017

(54) ROTISSERIE BRACKET

(71) Applicant: W.C. Bradley Co., Columbus, GA (US)

(72) Inventors: William Ladon Hopkins, Columbus, GA (US); John R. Allen, Cataula, GA (US)

(73) Assignee: W.C. Bradley Co., Columbus, GA (US)

( * ) Notice: Subject to any disclaimer, the term of this patent is extended or adjusted under 35 U.S.C. 154(b) by 212 days.

(21) Appl. No.: 14/251,245

(22) Filed: Apr. 11, 2014

(65) Prior Publication Data

US 2014/0305318 A1 Oct. 16, 2014

Related U.S. Application Data

(60) Provisional application No. 61/810,902, filed on Apr. 11, 2013.

(51) Int. Cl.
*A47J 37/04* (2006.01)
*A47J 37/07* (2006.01)

(52) U.S. Cl.
CPC ......... *A47J 37/041* (2013.01); *A47J 37/0786* (2013.01)

(58) Field of Classification Search
CPC .............................. A47J 37/041; A47J 37/0786
USPC .......... 99/419, 421 R, 421 H, 426, 427, 449; 226/9 R, 9 B, 25 AA
See application file for complete search history.

(56) References Cited

U.S. PATENT DOCUMENTS

| | | | | |
|---|---|---|---|---|
| 2,654,307 A | * | 10/1953 | Nisenson | A47J 37/041 99/421 H |
| 2,813,478 A | * | 11/1957 | Popple | A47J 37/041 126/25 R |
| 3,247,779 A | * | 4/1966 | Willman | A47J 37/041 248/201 |
| 3,248,518 A | * | 4/1966 | Ogle, Jr. | A47J 37/041 219/403 |
| 3,344,736 A | | 10/1967 | Myler et al. | |
| 4,924,766 A | * | 5/1990 | Hitch | A47J 37/049 99/419 |
| 5,224,676 A | | 7/1993 | Johnston | |
| 5,666,888 A | * | 9/1997 | Dame | A47B 9/06 108/143 |
| 5,911,812 A | * | 6/1999 | Stanek | A47J 37/067 126/25 R |
| 7,455,278 B2 | | 11/2008 | Hsu | |
| 2007/0240698 A1 | * | 10/2007 | Holbrook | A47J 37/0786 126/25 R |

FOREIGN PATENT DOCUMENTS

WO PCT/US2014/033869 8/2014

* cited by examiner

*Primary Examiner* — Thien S Tran
(74) *Attorney, Agent, or Firm* — David G. Woodral; Gable Gotwals

(57) ABSTRACT

A rotisserie mounting bracket assembly for a cooking grill having a cooking surface having a plurality of ribs. The bracket has a bracket base with at least one downward projection situated between a pair of adjacent ribs, and a bracket extension extending vertically from the bracket base and having at least one surface adapted to retain a skewer.

5 Claims, 3 Drawing Sheets

ROTISSERIE BRACKET

CROSS-REFERENCE TO RELATED CASES

This application claims the benefit of U.S. provisional patent application Ser. No. 61/810,902, filed on Apr. 11, 2013, and incorporates such provisional application by reference into this disclosure as if fully set out at this point.

FIELD OF THE INVENTION

This disclosure relates to equipment for cooking grills in general and, more specifically, to rotisseries for cooking grills.

BACKGROUND OF THE INVENTION

Barbecue grills currently sold are normally configured to cook food on the horizontal surface of a cooking grate or grid mounted above some type of heat source. The food is cooked sequentially on one side or another until appropriately done. It has long been known and practiced to cook food in an additional way on such products by placing larger pieces of food on a horizontal skewer some distance above the normal grilling surface and rotating it continuously until it is done. Typically this skewer is rotated by an electric motor located outboard of the cooking area so as to be less affected by heat and the skewer runs through two simple bearings supported on brackets on each side of the cooking area. This is normally referred to as a rotisserie kit. It will be clearly noted that the length of the skewer is then determined by the spacing between brackets which are spaced on fixed distance that defines the outer edges of the cooking area.

It will be realized that a specific set of parts, comprising a rotisserie kit, designed to fit one size and configuration of cooking area may not be large enough or be too large to fit another cooking area found on another barbecue grill. Therefore, there is a need to create a rotisserie kit that will fit all sizes of barbecue grills. This has typically been done by continuing to use the brackets that attach to the grill at the outer edges of the cooking area and by providing a multi-piece or telescoping skewer, it being well understood that a very long skewer that would fit all sizes of cooking area would become difficult to package and handle. However, the art of creating multi-piece or telescoping skewers creates complex, expensive and unreliable products due to the effects of prolonged exposure to heat and cooking products and by-products. It should also be realized that with a very large cooking area, which would normally be proportionally wide, the typical residential consumer need will still be to cook no more than one piece of meat, not necessarily using the full width of cooking area available.

SUMMARY OF THE INVENTION

The invention of the present disclosure, in one aspect thereof, comprises a rotisserie mounting bracket assembly for a cooking grill having a cooking surface having a plurality of ribs. The bracket has a bracket base with at least one downward projection situated between a pair of adjacent ribs, and a bracket extension extending vertically from the bracket base and having at least one surface adapted to retain a skewer.

In some embodiments, the bracket base and bracket extension are affixed together via a plurality of fasteners extending through first vertically slotted openings defined in each of the base and extension, the slotted openings allowing for adjustment of the height of the bracket extension extends from the base. A second vertically slotted opening may be defined in the bracket extension spaced apart vertically from the first vertically slotted opening to extend a height adjustment range of the bracket extension relative to the base. The bracket base may comprise a horizontal extension resting on the cooking surface and the at least one downward projection projects downward from the horizontal extension. In some cases, the bracket base comprises another downward projection spaced apart from the downward projection of the horizontal extension. A recess defined by the bracket extension may provide the surface adapted to retain a skewer.

The invention of the present disclosure, in another aspect thereof, comprises a rotisserie mounting bracket assembly for use in supporting a rotisserie skewer over a cooking surface defined by a plurality of ribs. The bracket assembly includes a bracket base resting on the cooking surface and providing a pair of downwardly extending projections base between a pair of adjacent ribs, an upwardly extending bracket extension affixed to the base and defining a recess for receiving and supporting the rotisserie skewer. A height at which the skewer is supported is adjustable by altering the respective locations on the base and bracket assembly where the two affix together.

In some embodiments, the bracket base and the bracket extension each define a pair of vertically slotted openings to allow for adjustment of the height of the bracket extension. The bracket extension may further define a second pair of vertically slotted openings spaced apart from the first pair to further extend the range of mounting heights of the bracket extension relative to the base.

The bracket may include a second pair of a pair of downwardly extending projections between a pair of adjacent ribs. A pair of horizontal extensions may interpose the upwardly extending bracket and one pair of the downwardly extending projections.

The invention of the present disclosure, in another aspect thereof, comprises a rotisserie kit for a cooking grill having a cooking surface comprising a plurality of spaced apart ribs, the kit comprising. The kit includes a bracket base having at least one downward projection situated between a pair of adjacent ribs, a bracket extension extending vertically from the bracket base and having at least one surface adapted to retain a skewer, and a skewer for supporting food suspended over the cooking surface and rotating on the bracket extension on a first end.

The kit may include a motor that supports the skewer on a second end spaced apart from the first end and rotates the skewer over the cooking surface. A motor mounting bracket may affix the motor in a fixed location relative to the cooking surface.

In some embodiments, the bracket base and bracket extension are affixed together via a plurality of fasteners extending through first vertically slotted openings defined in each of the base and extension, the slotted openings allowing for adjustment of the height the bracket extension extends from the base. A second vertically slotted opening may be defined in the bracket extension spaced apart vertically from the first vertically slotted opening to extend a height adjustment range of the bracket extension relative to the base. The bracket base may comprise a horizontal extension resting on the cooking surface with the at least one downward projection projecting downward from the horizontal extension. Another downward projection may be spaced apart from the downward projection of the horizontal extension.

DETAILED DESCRIPTION OF THE PREFERRED EMBODIMENTS

Figure 1:
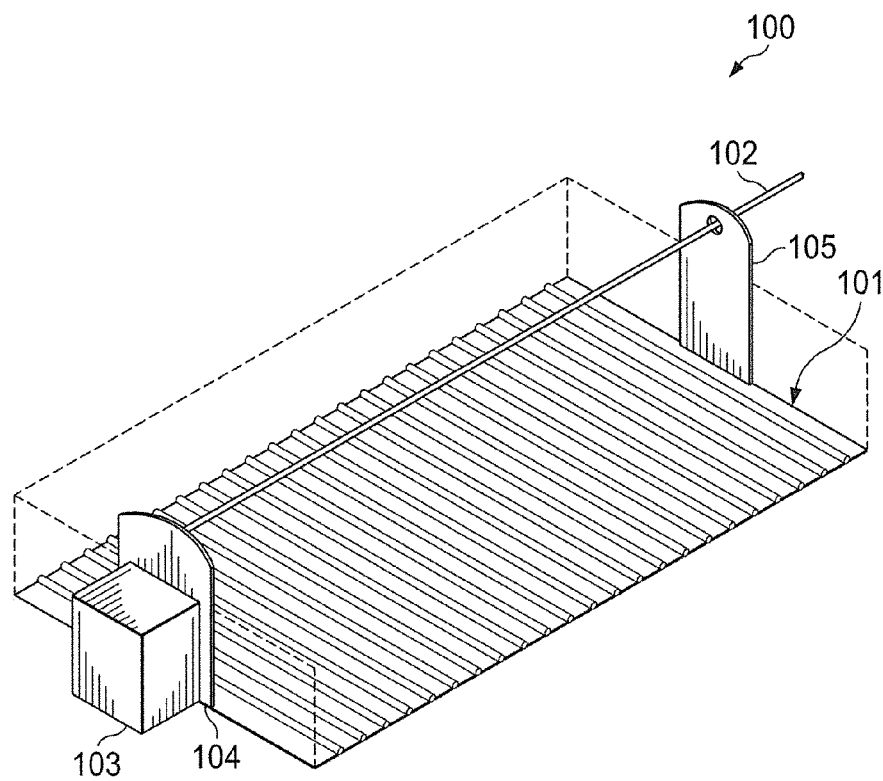
FIG. 1 is perspective view of a standard rotisserie kit.

Referring now to FIG. 1 a standard rotisserie kit 100 is shown on a cooking surface 101 of a cooking grill. The cooking grill could be a charcoal, gas, electric, or other grill. The kit 100 includes a skewer 102 having a length in excess of a width of the cooking surface 101. This enables a single kit to apply to a variety of grills and be sold as an aftermarket accessory or included with a newly packaged grill. An electric motor 103 may be mounted on one side of the cooking surface, possibly using a mounting bracket 104, and support a first end of the skewer 102. An opposite end of the skewer 102 is supported by a mounting bracket 105. The mounting brackets 104, 105 are stationary and mounted to the ends of, or spaced away from, the cooking surface 101. The method of attaching the brackets 104, 105 to the outside of the cooking 101 area may be with a bolt or other fastener.

Recognizing that a single skewer of moderate length meets the needs of the typical residential consumer, no matter what size cooking area is presented by their barbecue grill, various embodiments of the present disclosure provide a simpler and more versatile configuration.

Figure 2:
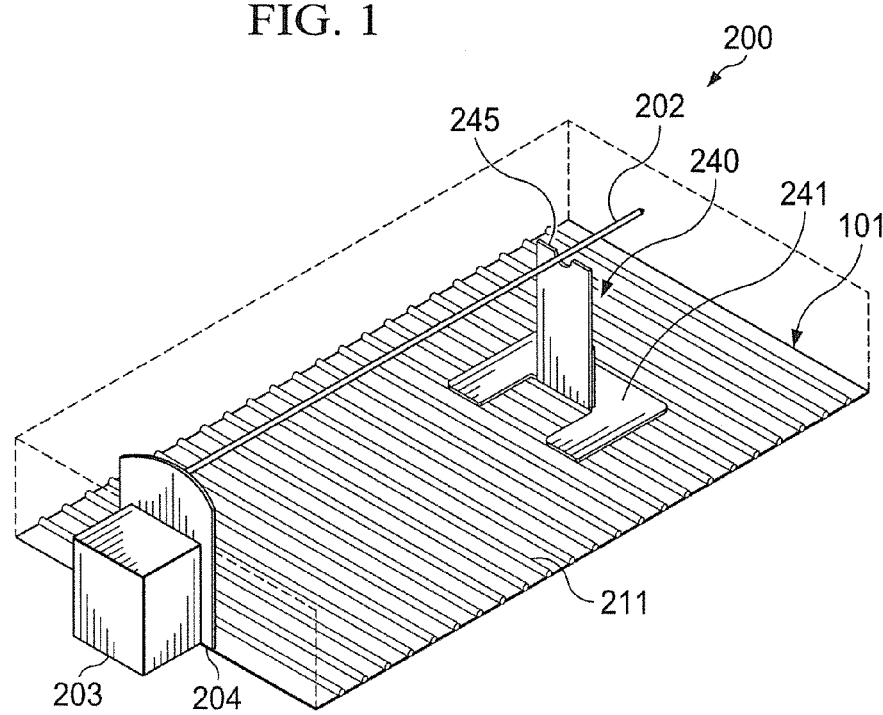
FIG. 2 is perspective view of a rotisserie kit according to aspects of the present disclosure.

Referring now to FIG. 2, a perspective view of a rotisserie kit 200 according to aspects of the present disclosure is shown. Here, a skewer 202 of moderate length is provided. The skewer 202 may not extend completely across the cooking surface 101 but will have a length sufficient to handle most, if not all, the rotisserie cooking needs of a residential consumer. In various exemplary embodiments the skewer may range in length from about 16 inches to about 24 inches. Given that the typical width of a cooking area of a residential grade grill is from about 24 inches to about 30 inches the skewer 202 will provide a usable rotisserie that is from about 60-80% of the width of the cooking surface 101 from side to side.

One end of the skewer 202 may be supported by a stationary bracket 204 and/or electric motor 203 that may be mounted to the bracket 204. The motor 203 may be mounted somewhat spaced away from the area immediately superior to the cooking surface 101 in order to avoid exposing the motor 203 to excessive heat. The end of the skewer 202 opposite the motor 203 may be supported by a bracket assembly 240 that rests directly on the cooking surface 101. In cases where the skewer 202 may be longer than the width of the cooking surface 101, the bracket assembly 240 may be placed near the edge of the cooking surface 101 opposite the stationary bracket 204. Any excess length of the skewer 202 beyond the bracket assembly 240 may simply rotate in space beyond the cooking surface 101. In cases where the width of the cooking surface 101 exceeds the available length of the skewer 202 extending from the motor 203, the movable bracket assembly 240 may be moved across the cooking surface 101 to a location close enough to the motor 203 to support the skewer 202.

In some embodiments, the movable bracket assembly 240 may be formed from a monolithic piece of heat resistant material, such as a metal alloy. In other embodiments, adjustment of height may be provided. The embodiment depicted in FIG. 2 is of the latter type with the bracket assembly 240 comprising a base 241 with an adjustable extension 245 as explained in greater detail below.

Figure 3:
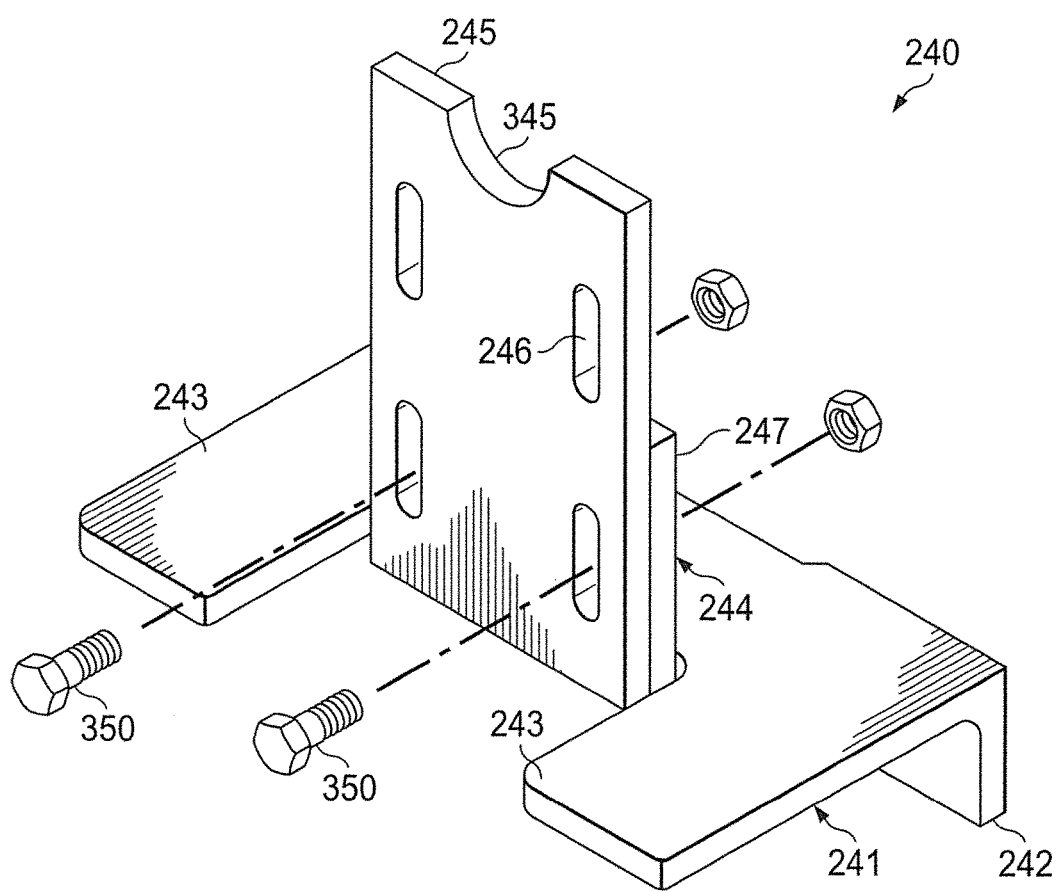
FIG. 3 is a perspective view of a mounting bracket assembly according to aspects of the present disclosure.

Referring now to FIG. 3, a perspective view of a bracket assembly 240 according to aspects of the present disclosure is shown. Here, for purposes of illustration, the movable bracket assembly 240 is shown removed from the remainder of the rotisserie kit 200 of FIG. 2. The materials of construction for bracket assembly 240 are selected from those suitable for prolonged exposure to high heat and may include, but are not limited to, steel or stainless steel. The individual components of bracket assembly 240 may be formed by casting, machining or stamping, and then adding appropriate bends and angles to the metal as shown (if needed).

In the present embodiment, the bracket 240 comprises a bracket base 241 and a bracket extension 245. The base 241 includes a pair of holes 247, that may be vertically slotted. The extension 245 provides at least one pair of holes 246, which may also be vertically slotted. In some embodiments, the extension 245 and/or the base 241 may comprise multiple sets of holes (slotted or otherwise). A recess 345 may be defined in the extension 245 to receive and rest the end of the skewer 202 opposite the motor 203 (see FIG. 2).

Fasteners 350 may be utilized to secure the base 241 to the extension 245 via the respective holes 247, 246. Fasteners 350 may comprise nuts and bolts of various kinds, or other fasteners known to those of skill in the art. The amount of elevation provided by the extension 245 away from the base 241 may be varied by moving the extension to the desired height before the fasteners 350 are tightened. In the event the slotted holes 247, 246 do not provide the requisite degree of elevation, the fasteners may be moved to another pair of holes (where multiple pairs of holes are provided). The size, or "footprint" of the base 241 on the cooking surface 101 may be commensurate with the allowable elevation from the bracket assembly 240. In other words, a very tall bracket assembly 240 may need a relatively larger footprint on the cooking surface 101 to remain adequately stable under load and rotational force from the skewer 202.

In some embodiments, the bracket base 241 has a downward vertical projection or projections 242. The projections 242 may be formed from a bend in the material comprising the base 241. The projections 242 may be received in a chosen space between the multiple ribs 211 that define the cooking surface 101 of a typical barbecue grill. The projections 242 placed between the ribs 211 serve to aid in anchoring the bracket assembly 240 against inadvertent lateral movement along the surface of the cooking surface 101 when the bracket assembly 240 is under load or the skewer 202 is being inserted or removed.

The bracket base 241 may also comprise horizontal extensions 243 to provide additional stability for the bracket assembly 240. They may also serve to increase the presence or footprint of the bracket assembly 240 on the cooking surface 101. The extensions 243 may have additional downward vertical projections (e.g., such as 242) engaging the space between multiple ribs 211 normally found on barbecue grills (see projections 400 of FIG. 4).

The bracket base 241 also has an upwardly extending vertical extension 244, which may define the openings 247. In embodiments where the bracket assembly 240 is not adjustable for height, the extension 244 may not necessarily provide openings 247. However, in such cases, the extension 244 may define a recess for retaining the skewer 202 (which recess would be instead of, or in addition to, the recess 345) on extension 245.

In various embodiments, the bracket assembly 240 may be capable of supporting the skewer 202 from just above the cooking surface 101 up to about 6 inches or more above the surface 101. The width of the base 241 (lateral to the skewer 202) may range up to 6 inches or more. Front to back (along the length of the skewer 202) the base 241 may range up to 3 inches or more. The dimensions given are only exemplary. As discussed, if a large heavier skewer is used, the dimensions of the bracket assembly 240 may be scaled up accordingly without departing from the intended scope of the present disclosure.

Figure 4:
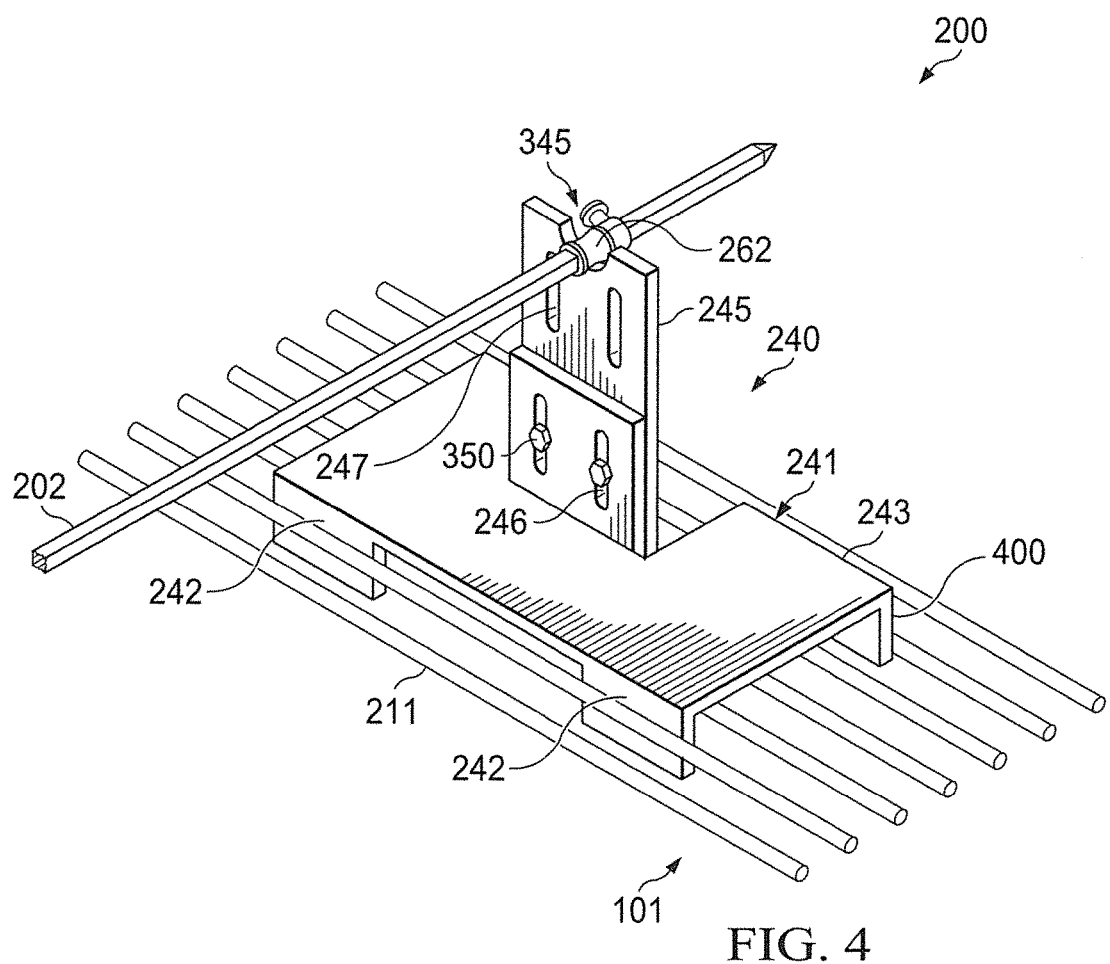
FIG. 4 is close up perspective view of a mounting bracket assembly with seated rotisserie skewer according to aspects of the present disclosure is shown.

Referring now to FIG. 4 a close up perspective view of the bracket assembly 240 assembly with seated rotisserie skewer 202 according to aspects of the present disclosure is shown. The manner in which the bracket base 241 and extension 245 fit together, along with the respective slotted openings 247, 246 provides for adjustment of the height of the skewer 202. The base 241 and extension 245 may be fitted together with fasteners 350 that are user adjustable. The fasteners 350 may be loosened to allow setting the height, and then tightened to maintain proper height. In this way, differences in the height of the cooking grill relative to the mounting location for the motor 203 and its associated bracket 204 may be compensated for, without the need for a grill bracket for the motor with a custom-set height.

It will also be appreciated that some variation may be needed as to the distance between the motor bracket 204 (FIG. 2) and the grill bracket assembly 240. As described above, the grill bracket assembly 240 sits on, or fits partially into, the ribs 211 of the grill cooking surface 101. The grill bracket assembly 240 may be placed at a location on the cooking surface 101 such that it properly supports the skewer 202 during use. The embodiment shown in FIG. 4 also features an additional pair of downward projections 400 projecting from horizontal extensions 243. As with projections 242, the projections 243 may be placed between adjacent ribs 211 to provide additional stability against lateral movement of the bracket assembly 240.

With some grill and rotisserie combinations, the skewer 202 may not be round in cross section. For example, it may be square or have some other shape to allow the rotisserie to rotate the item being cooked rather than spinning within it—particularly if the cooked item is skewered somewhat off-center. Devices common to the art may be placed along the skewer to further locate and fix the position and orientation of food to be cooked. In order to allow the skewer to rotate smoothly within the top of the bracket extension, an adjustable collar 262 may fit over the skewer. An interior of the collar 262 will be configured to ride along the skewer 202, while the outer surface may be substantially rounded to ride within the recess 345 on the bracket assembly 240. The outer surface of the collar 262 may be smooth or otherwise polished to reduce friction. In some cases, it will be provided with a set screw to accommodate differences from one cooking grill to another in the distance between the motor bracket and the grill bracket. The screw may be loosened for adjustment and then tightened against the skewer at the proper location.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. A rotisserie kit for a cooking grill having a cooking surface comprising a plurality of spaced apart ribs that define spaces between adjacent pairs of ribs, the kit comprising:
    a bracket base having a bracket extension extending vertically from the bracket base and having at least one surface adapted to retain a skewer;
    a first horizontal extension on one side of the bracket extension;
    a second horizontal extension on an opposite side of the bracket extension; and
    a skewer for supporting food suspended over the cooking surface and rotating on the bracket extension on a first end;
    wherein the first horizontal extension provides a first pair of downward projections, each one fitting into a separate space between a pairs of adjacent ribs when the bracket base is placed onto the cooking surface; and
    wherein the second horizontal extension provides a second pair of downward projections, each one fitting into a separate space between the two pairs of adjacent ribs when the bracket base is placed on the cooking surface.

2. The kit of claim 1, further comprising a motor that supports the skewer on a second end spaced apart from the first end and rotates the skewer over the cooking surface.

3. The kit of claim 2, further comprising a motor mounting bracket that affixes the motor in a fixed location relative to the cooking surface.

4. The kit of claim 3, wherein the bracket base and bracket extension are affixed together via a plurality of fasteners extending through first parallel and vertically slotted pairs of openings defined in each of the base and extension, the parallel and vertically slotted pairs of openings allowing for adjustment of the height the bracket extension extends from the base.

5. The kit of claim 4, further comprising a second parallel and vertically slotted pair of openings defined in the bracket extension spaced apart vertically from the first vertically slotted openings to extend a height adjustment range of the bracket extension relative to the base.

* * * * *